(12) United States Patent
Erle et al.

(10) Patent No.: US 8,417,761 B2
(45) Date of Patent: Apr. 9, 2013

(54) DIRECT DECIMAL NUMBER TRIPLING IN BINARY CODED ADDERS

(75) Inventors: Mark Alan Erle, Macungie, PA (US); Brian John Hickmann, Hillsboro, OH (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 12/329,706

(22) Filed: Dec. 8, 2008

(65) Prior Publication Data

US 2010/0146031 A1 Jun. 10, 2010

(51) Int. Cl.
*G06F 7/50* (2006.01)

(52) U.S. Cl. ........ 708/623; 708/493; 708/620; 708/624; 708/628; 708/683

(58) Field of Classification Search ................... 708/493, 708/620, 623, 624, 628
See application file for complete search history.

(56) References Cited

U.S. PATENT DOCUMENTS

| | | | |
|---|---|---|---|
| 3,890,496 A | 6/1975 | Hartzog | |
| 4,172,288 A * | 10/1979 | Anderson | ..................... 708/673 |
| 4,745,569 A | 5/1988 | Yamoaka et al. | |
| 4,878,193 A | 10/1989 | Bernstein et al. | |
| 5,007,010 A | 4/1991 | Flora | |
| 5,258,945 A | 11/1993 | Lee et al. | |
| 5,379,245 A | 1/1995 | Ueda | |
| 5,426,599 A | 6/1995 | Machida | |
| 7,096,137 B2 * | 8/2006 | Shipton et al. | ................ 702/106 |
| 7,136,893 B2 * | 11/2006 | Carlough et al. | ............. 708/623 |
| 7,412,476 B2 * | 8/2008 | Busaba et al. | ................ 708/623 |
| 7,523,150 B2 * | 4/2009 | de Brebisson | ................ 708/204 |
| 7,707,233 B2 * | 4/2010 | Cornea-Hasegan | .......... 708/204 |
| 7,814,138 B2 * | 10/2010 | Cornea-Hasegan | .......... 708/680 |
| 8,209,370 B2 * | 6/2012 | Lablans | ........................ 708/493 |

FOREIGN PATENT DOCUMENTS

JP 04330519 11/1992

OTHER PUBLICATIONS

"A 54×54 Bit Multiplier with new Redundant Binary Booth's encoding" by Nurettin Besli and R.G. Deshmukh from Proceedings of 2002 IEEE Canadian Conference on Electrical & Computer Engr. vol. 2 pp. 597 to 602.
"A Nonredundant-Radix-4 Serial Multiplier" by Kamla K. Primlani & Jack L. Meador from IEEE Journal of Solid-State Circuits, vol. 24 No. 6, Dec. 1989, pp. 1729 to 1736.
"A New Family of High-Performance Parallel Decimal Multipliers" by Alvaro Vazquez, Elisardo Antelo and Paolo Montuschi.

\* cited by examiner

*Primary Examiner* — Tammara Peyton
(74) *Attorney, Agent, or Firm* — Fleit Gibbons Gutman Bongini & Bianco PL; Jon A. Gibbons

(57) ABSTRACT

The digital propagate, digit generate, sum+0, and sum+1 terms used in typical carry-propagate adders are generated directly off the multiplicand. During the direct generation, the logic takes into account that each digit will be tripled and if each digit's next less significant digit is greater than 4. Using this technique, the generation of the multiplicand is significantly faster and uses less circuitry.

20 Claims, 6 Drawing Sheets

| LINE | INPUT DIGIT (DECIMAL) | INPUT DIGIT (RCD-8421) | NEXT LESS SIGNIFICANT DIGIT >=5 | DIGIT GENERATE | DIGIT PROPAGATE | SUM+0 (DECIMAL) | SUM+0 (BCD-4221) | SUM+1 (DECIMAL) | SUM+1 (BCD-4221) |
|---|---|---|---|---|---|---|---|---|---|
| 1 | 0 | 0000 | 0 | 0 | 0 | 0 | 0000 | 1 | 0001 |
| 2 | 1 | 0001 | 0 | 0 | 0 | 3 | 0011 | 4 | 1000 |
| 3 | 2 | 0010 | 0 | 0 | 0 | 6 | 1010 | 7 | 1011 |
| 4 | 3 | 0011 | 0 | 0 | 1 | 9 | 1111 | 10 | 0000 |
| 5 | 4 | 0100 | 0 | 1 | 0 | 12 | 0010 | 13 | 0011 |
| 6 | 5 | 0101 | 0 | 0 | 0 | 5 | 1001 | 6 | 1010 |
| 7 | 6 | 0110 | 0 | 1 | 0 | 8 | 1110 | 9 | 1111 |
| 8 | 7 | 0111 | 0 | 1 | 0 | 11 | 0001 | 12 | 0010 |
| 9 | 8 | 1000 | 0 | 1 | 0 | 14 | 1000 | 15 | 1001 |
| 10 | 9 | 1001 | 0 | 1 | 0 | 17 | 1011 | 18 | 1110 |
| 11 | 0 | 0000 | 1 | 0 | 0 | 1 | 0001 | 2 | 0010 |
| 12 | 1 | 0001 | 1 | 0 | 0 | 4 | 1000 | 5 | 1001 |
| 13 | 2 | 0010 | 1 | 0 | 0 | 7 | 1011 | 8 | 1110 |
| 14 | 3 | 0011 | 1 | 0 | 1 | 10 | 0000 | 11 | 0001 |
| 15 | 4 | 0100 | 1 | 1 | 0 | 13 | 0011 | 14 | 1000 |
| 16 | 5 | 0101 | 1 | 0 | 0 | 6 | 1010 | 7 | 1011 |
| 17 | 6 | 0110 | 1 | 1 | 0 | 9 | 1111 | 10 | 0000 |
| 18 | 7 | 0111 | 1 | 1 | 0 | 12 | 0010 | 13 | 0011 |
| 19 | 8 | 1000 | 1 | 1 | 0 | 15 | 1001 | 16 | 1010 |
| 20 | 9 | 1001 | 1 | 1 | 0 | 18 | 1110 | 19 | 1111 |

FIG.2

| | HUNDREDS COLUMN = 1 | TENS COLUMN = 7 | ONES COLUMN = 4 | COMMENT |
|---|---|---|---|---|
| DIGIT GENERATE | 0 | 1 | 1 | |
| DIGIT PROPAGATE | 0 | 0 | 0 | |
| SUM+0 | 4 | 1 | 2 | |
| SUM+1 | 5 | 2 | 3 | |
| FINAL DIGIT-ONES | | | 2 | SUM+0 CHOSEN AS THERE IS NO CARRY-IN |
| FINAL DIGIT-TENS | | 2 | | SUM+0 CHOSEN AS THERE WAS A GENERATE IN THE ONES COLUMN |
| FINAL DIGIT HUNDREDS | 5 | | | SUM+1 CHOSEN AS THERE IS A GENERATE IN THE HUNDREDS COLUMN |

DIRECT DECIMAL NUMBER TRIPLING IN BINARY CODED ADDERS

FIELD OF THE INVENTION

The present invention relates to multiplication using binary coded decimal (BCD) adders and more particularly, to generating multiplicands for use in such multiplication.

BACKGROUND OF THE INVENTION

Computations may be carried out within a computer under a variety of number coding systems, including simple binary coded (SBC) systems and binary coded decimal (BCD) systems.

In simple binary coded (SBC) numbering, the decimal numbers zero through fifteen are represented by the 4-bit code series, 0000, 0001, 0010, ..., 1110, 1111. Simple binary coded (SBC) numbering is generally preferred for carrying out arithmetic computations since this representation of decimal numbers enable basic digital circuit components to perform basic arithmetic operations in the same manner as decimal operations are performed.

In a binary coded decimal (BCD) numbering system, the decimal digits, zero through nine, are also represented by a 4-bit code series, 0000, 0001, 0010, ..., 1000, 1001. But the remaining 4-bit binary codes, 1010 through 1111 of the sequence, have no digital numerical meaning, instead, numbers in the range ten through fifteen are represented by two 4-bit codes (two digits), as are all further numbers up to and including ninety-nine.

Because of this lack in continuity in decimal (BCD) numbering, certain operations result in meaningless or erroneous results. For instance, a one-bit shift-left operation on a binary coded decimal six (represented by the bit series: 0000, 0110) does not produce a binary coded decimal twelve (represented by the bit series: 0001, 0010). Instead, it produces a bit series (0000 1100) which has no meaning in the domain of binary coded decimal numbers. Similarly, a one-bit shift-right operation on a binary coded decimal twelve (represented by the bit series 0001 0010) does not produce a BCD representation of a digital six but rather a bit series (0000 1001) which represents a digital nine in the BCD numbering system.

As a result of resulting calculation errors caused by the discontinuity in the binary meaning of certain digital calculations, a different and more complex set of bit-manipulation rules have to be followed within a digital computer for performing arithmetic operations such as addition, subtraction, multiplication and division of binary coded decimal (BCD) numbers, Despite these difficulties, there are instances where it is advantageous to carry out arithmetic computations directly on BCD numbers without transforming the BCD numbers into simple binary coded numbers, particularly where data are stored in the BCD format.

When multiplication and division operations are to be carried out directly on BCD formatted numbers, it is advantageous to be able to quickly generate signals representing the one-times (×1) through nine-times (×9) multiples of every multidigit BCD (binary coded decimal) number that can be represented by a predefined number of bits (e.g., 64 bits). If a first BCD number (multiplicand) is to be multiplied by a second BCD number (multiplier), the final product is typically generated by adding shifted multiples of the multiplicand. These multiples are commonly referred to as "partial products." Each partial product is equal to the product of the multiplicand and a corresponding single digit within the multiplier.

Previous approaches to generating multiples of a BCD multiplicand consume either excessive amounts of computer time or an excessive amount of circuit real estate. Particularly time consuming is the generation of the multiple for use as a partial product to be added to other partial products in certain fixed point or floating point multiplying. The problem is that generating the multiple can be time consuming.

Various approaches to solving this problem are summarized in the paper by Alvaro V'azquez, Elisardo Antelo and Paolo Montuschi, entitled; "A New Family of High-Performance Parallel Decimal Multipliers", 18th IEEE Symposium on Computer Arithmetic, June 2007, which shows a multiplicand triple being developed by converting from BCD-8421 to BCD-4221. A. Yamaoka and K. Wada and K. Kuriyama's "Decimal Multiplier Device and Method Therfor", U.S. Pat. No. 4,745,569, May 1998 showed a multiplicand triple being developed by successive additions of the multiplicand. T. Ueda, "Decimal Multiplying Assembly and Multiple Module" U.S. Pat. No. 5,379,245, January 1995 shows a multiplicand triple being developed by examining a digit of the multiplicand, a digit of the multiplier, and any incoming carry or carries.

One approach involves generating a double of the multiplicand, and then adding the multiplicand to that doubled amount via a carry-propagate addition. However, a carry propagate addition is time consuming and with 34-digit, and even 16-digit operands (these two operand lengths being suggested by the recently approved IEEE Standard on Floating-Point Arithmetic—P754-2008), such addition can be a cycle-limiting factor.

BRIEF DESCRIPTION OF THE INVENTION

In accordance with the present invention, the values used for carry-propagate adders for generating a partial product are generated directly off of the multiplicand, including the direct generation of the digital propagate, digit generate, sum+0, and sum+1. During this direct generation, the logic takes into account that each digit will be multiplied, as, for example, the triple of the multiple of the multiplicand, and determined whether each digit's next less significant digit is greater than 4. Using this technique, the generation of the multiplicand's partial product is significantly fester and uses less circuitry.

Additional features and advantages are realized through the techniques of the present invention. Other embodiments and aspects of the invention are described in detail herein and are considered apart of the claimed invention. For a better understanding of the invention with advantages and features, refer to the description and to the drawings.

BRIEF DESCRIPTION OF THE DRAWINGS

These and other objects, features and advantages of the present invention can best be understood by reading the following description of a preferred embodiment of the invention while referring to the accompanying drawings of which:

FIG. 2 is a truth table for direct tripling with the method of direct tripling shown in FIG. 1;

FIG. 3 is a table illustrating the direct tripling of the number "174" using the method and troth table illustrated in FIGS. 1 and 2, respectively;

DETAILED DESCRIPTION OF A PREFERRED EMBODIMENT OF THE INVENTION

Figure 1:
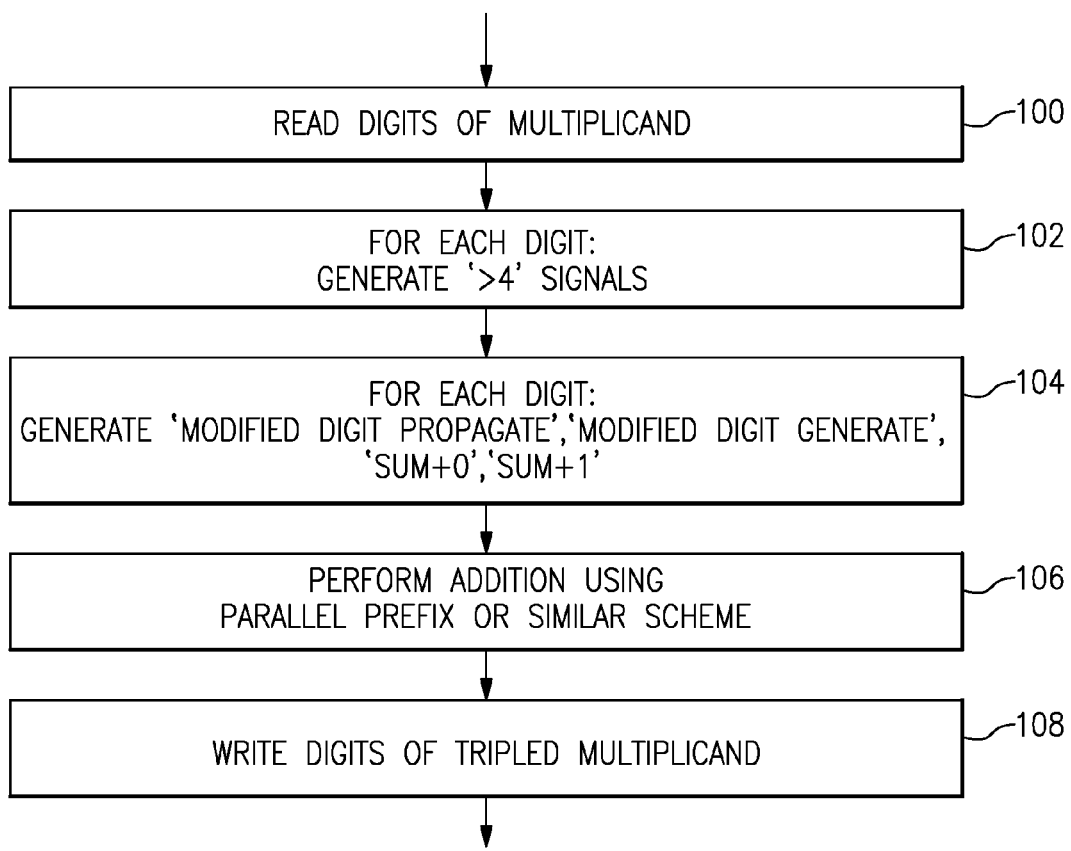
FIG. 1 is a flow diagram that shows the generation of a tripled multiplicand.

In FIG. 1 in the process of the present invention the digits of the multiplicand 100 are read and for each digit it is determined whether its value is greater than 4 102 with the magnitude of each digit relative to 4 known, modified digit propagate, modified digit generate, sum+0, and sum+1 values are determined 104 for each digit based on whether the next lower order digit is equal to or less than 5. Using parallel prefix or similar scheme, alt the digits of the partial product multiplicand, illustrated as a triple of the multiplicand, are determined 106 and then written 108.

FIG. 2 is a truth table for the method disclosed in FIG. 1 providing in two sets the values of the digit generate, digit propagate, sum+0, and sum+1 values for each given decimal input digit 1 to 10 its BCD form and a given single digit control signal indicating if the next less significant digit is greater than 4. The generate and propagate terms are developed as if the multiplicand input digit is first doubled and then added to the input digit. That is why the next less significant digit is examined to determine if it is greater than four in which case, doubling would produce a carry out. Although the input digit is in Binary Coded Decimal BCD-8421 form to represent decimal digits, the sum+0 and sum+1 values are in BCD-4221 form to represent partial product digits, in our preferred embodiment. It is recognized mat alternative encoding could be used with different delay tradeoffs.

In FIG. 3, using the example of a triple, three input digits 174 are provided for tripling using the truth table of FIG. 2. In the ones column of FIG. 3, From Line 5 in FIG. 2, digit generate=1, digit propagate=0, and sum+0=2 (the sum+1 is irrelevant in this position as there is no carry-in). In the tens column of FIG. 3, From Line 8 in FIG. 2, digit generate=1, digit propagate=0, sum+0=8, and sum+1=9, In the hundreds column of FIG. 3, From Line 12 in Table 1, digit generate=0, digit propagate=0, sum+0=4, and sum+1=5.

The digit generate=1 in the ones column takes into account mat the tripling of 4 is 12, so a carry-out is necessary. The digit generate=1 in the tens column takes into account that die tripling of 7 is 21, so a carry-out is necessary. But actually two carry-outs are necessary. The other carry-out is taken care of when the next more significant digit examines the tens column and determines that the digit is greater than 4, so the sum+0 and sum+1 chosen will be two values already incremented by one. The sum+0 and sum+1 in the hundreds column takes into account the next significant digit is greater than 4, so there will be a carry-out. So even though the tripling of 1 is only 3, the final sum will be at least 4 . . . . Hence sum+0=4 and sum+1=5.

The following are sample logic equations for the digit generate, digit propagate, sum+0, and sum+1 specified in FIG. 2. Other solutions are possible Spending on the minimization algorithm used. In the equation, v0–v3 are the input digit bits, i.e., input[0 . . . 3], and v4 is the control signal indicating the next less significant digit is greater than 4.

```
generate = (v1&!v2&!v3&!v4) | (v1&v2&v3&!v4) | (v2&v3&v4) |
(v1&!v2&!v3&v4) | (v0);
propage = (!v2&v2&v3&!v4) | (v1&v2&!v3&v4);
sum_0[0] = (!v1&v2&!v3&!v4) | (!v1&v2&v3&!v4) | (v1&!v2&v3&!v4) |
(!v2&v3&v4) | (v1&v2&!v3&v4) | (v2&!v3&!v4) | (v0);
sum_0[1] = (v1&v2&!v3&!v4) | (v0&v3&v4) | (!v1&v2&v3&!v4) |
(v1&v2&!v3&v4);
sum_0[2] = (!v1&!v2&v3&!v4) | (v1&!v2&!v3&!v4) | (v0&v3&v4) |
(!v1&v2&!v3&v4) | (v1&!v2&!v3&v4) | (!v1&v2&v3&!v4) |
(v1&v3&v4) | (v1&v2&!v3&v4) | (v2&!v3&!v4);
sum_0[3] = (!v1&v2&v3&!v4) | (v1&v2&v3&!v4) | (!v1&!v3&v4) |
(v1&!v2&!v3&v4) | (!v1&v2&v3&!v4) | (v1&!v2&v3&!v4) |
(v1&v2&!v3&v4);
sum_1[0] = (!v1&!v2&v3&!v4) | (!v1&v2&!v3&v4) | (v1&!v2&!v3&v4) |
(v1&!v2&v3&!v4) | (!v2&v3&v4) | (v2&!v3&!v4) | (v0);
sum_1[1] = (v1&v2&!v3&!v4) | (!v1&v2&!v3&v4) | (v0&v3);
sum_1[2] = (v1&!v2&!v3&v4) | (v1&v2&v3&!v4) | (!v1&!v3&v4) |
(v1&!v2&v3&!v4) | (v1&v3&v4) | (v0&v3) | (v2&!v3&!v4);
sum_1[3] = (v2&v3&v4) | (!v3&!v4) | (!v2&v3&v4);
```

And bore is the equation for the control signal which indicates the input digit is greater than 4. In the equation, t0–t3 are the next less significant digit bits $Gt\_four=(t0)\,(t1\&t2)\,(t1\&t3);$ With the digit generate, digit propagate, sum+0, and sum+1 available, various existing techniques for implementing, the carry-network can be used to select the appropriate final digit from the sum+0 and sum+1 values in each digit position, i.e., the carry-network is not considered to be a distinctive attribute.

Figure 4:
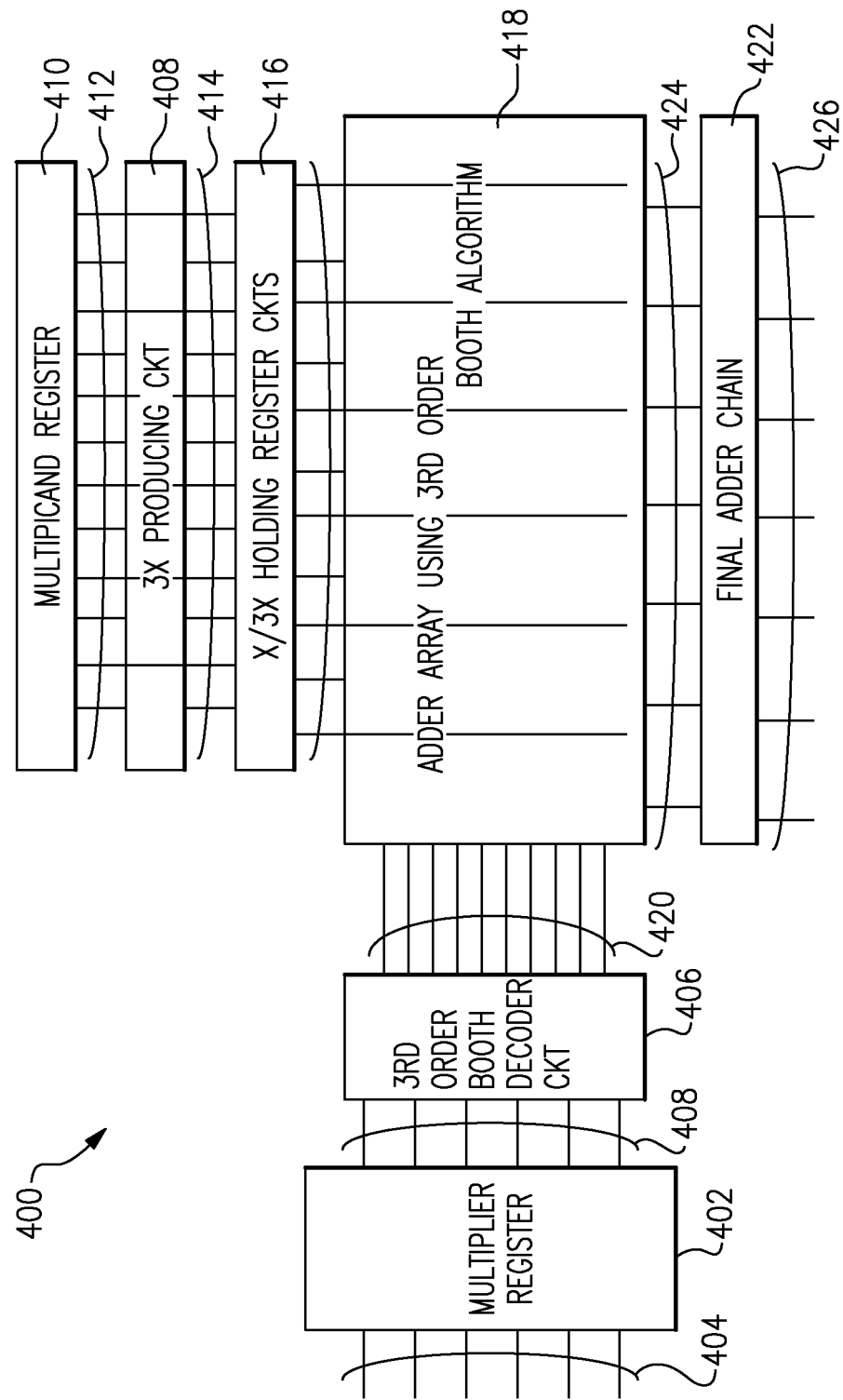
FIG. 4 is a BCD multiplier incorporating the method of FIG. 1.

FIG. 4 is a diagram showing the structure of a multiplier in incorporating the present invention. In FIG. 4, the multiplier 400 includes multiplier register 7 circuit 402 for multiplier data Y received through signal lines 404; a third order Booth decoder circuit 406 for receiving the multiplier data held at multiplier register circuit 402 through data lines 408 and performing a decoding operation based on a third order Booth algorithm; multiplicand partial product circuit 408 for receiving the multiplicand X from the multiplicand register through signal lines 412 and producing the required number 3X for the partial product; a holding circuit 416 in which the number 3X and the multiplicand X are received through signal lines 414; An adder array 418 for receiving the output of register circuit 416 and performing multiplication utilizing a decoding result signal received from the third order Booth decode circuit 406 through lines 420; and final adder chain 422 for adding up intermediate sums from adder array 418 on lines 424 and outputting a final multiplication result onto signal lines 426.

Figure 5:
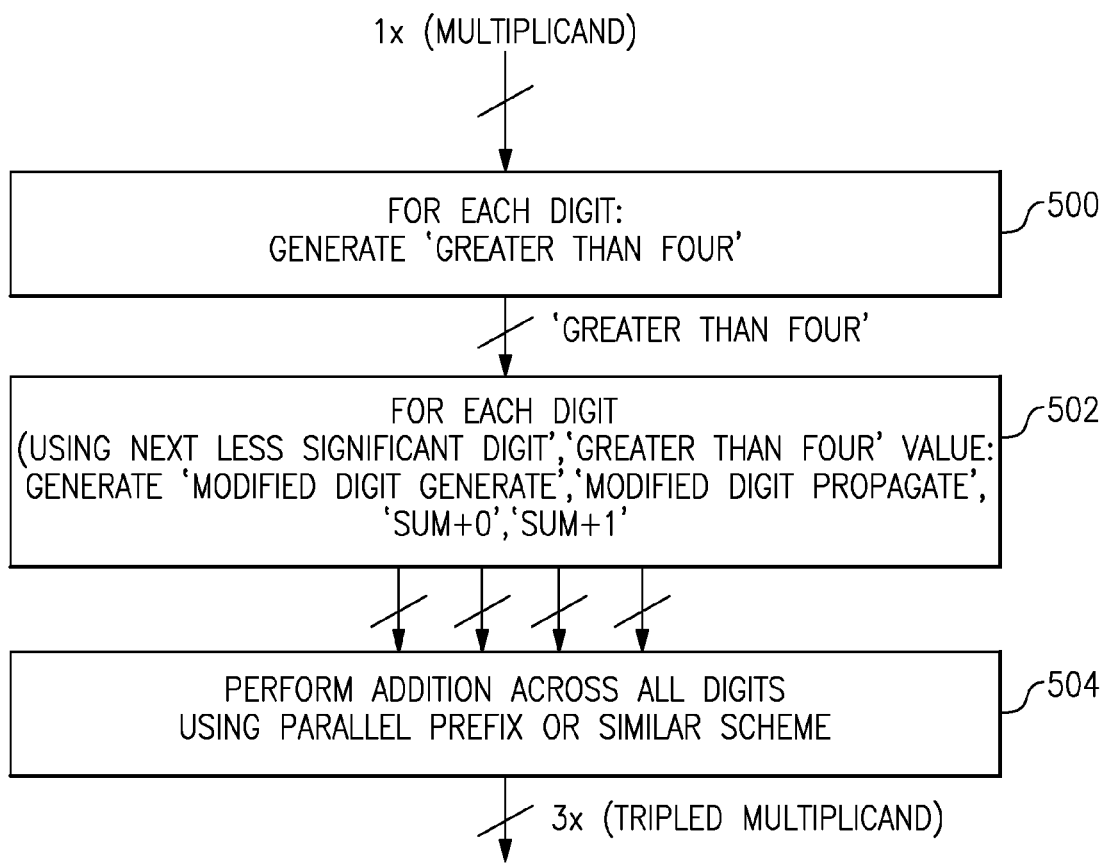
FIGS. 5 and 6 are a block and a logic flow diagram of multiplicand tripling in accordance with the method of FIG. 1 in the multiplier of FIG. 4.
Figure 6:
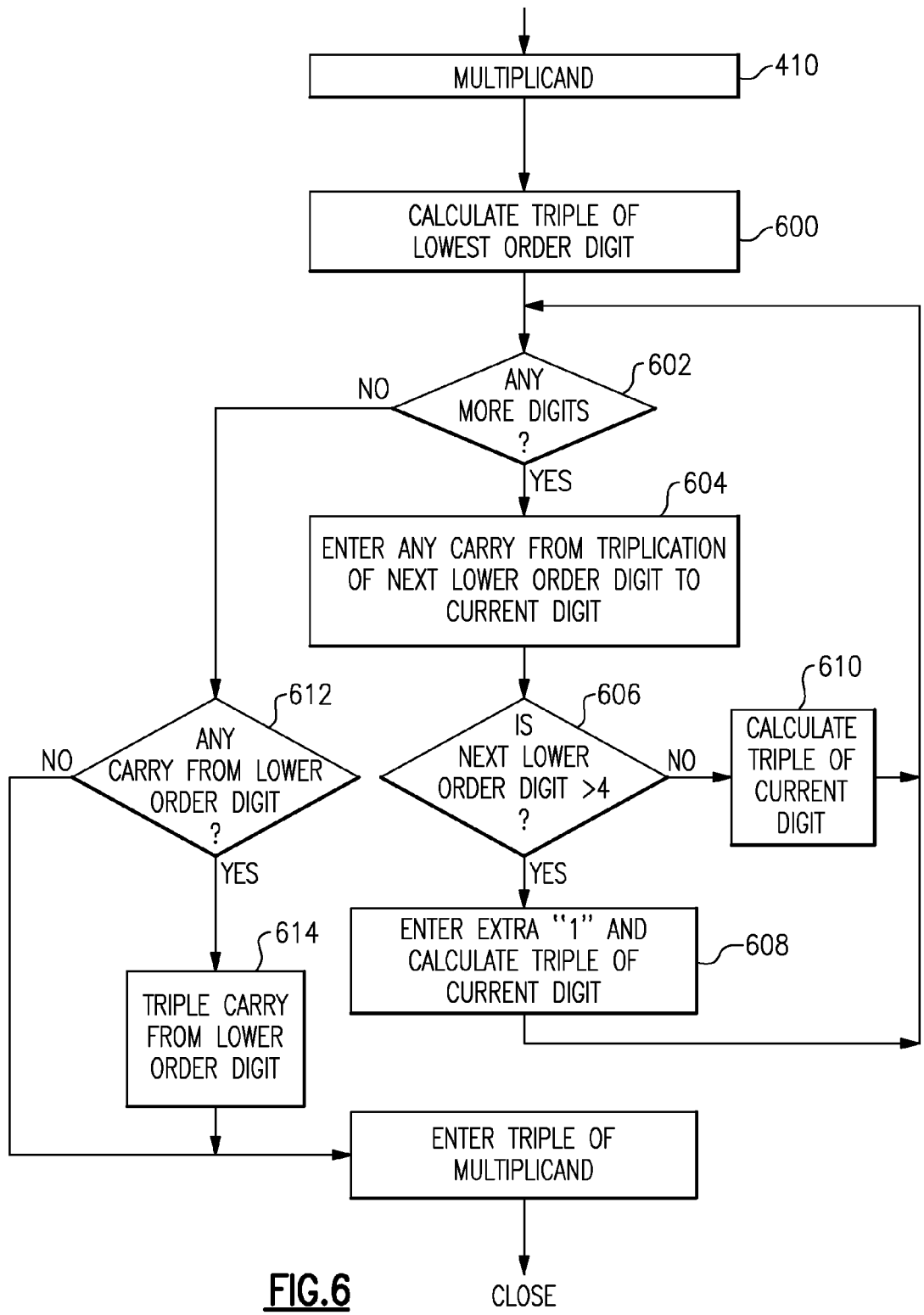

In the structure of the multiplier shown in FIG. 4, the required number 3X for the partial product of the multiplicand X is produced in a 3X producing circuit. The structure of the partial product circuitry shown in FIG. 5 does not require an intervening operation. First, for each digit of the multiplicand of FIG. 4, a greater than 4 signal 500 is generated. Then using the next less significant digit greater than 4 value for each digit, a modified digit generate, modified digit propagate, sum+0, and sum+1 is generated 502. Thereafter, multiplication of the multiplicand is performed across all digits thereof. As shown in FIG. 6, the lowest order digit of the multiplicand in the multiplicand register of FIG. 4 is tripled 600 and it is determined whether there are anymore digits in the multiplicand 602. If there are further digits, the carry from the triplication process of the next lower order digit is entered into the present digit 604. Then it is determined if the next lower order digit is greater than 4 606. If it is, a decimal 1 is entered and the triple of the current digit is calculated. If the next lower order digit is less than 4, the triple of the current digit is calculated without the addition of the decimal 1 610. When the calculation of either of 608 or 610 has been made, it is determined whether any more digits exist in the multiplicand. If there are further digits, 602 to 608 or 610 are repeated for each of those digits. If there are no further digits, it is determined if mere is a carry out from the last calculated current digit in 612. If there is a carry out the carry out is tripled in step 614. Whether or not the calculation step 614 is necessary, the triple of the multiplicand is then entered into the register 416. Thereafter, the multiplicand X and its triplication value 3X are applied to the adder array 418 in the multiplication of the multiplicand by the multiplier.

With the above triplication process, the time necessary to produce the triple of the multiplicand is reduced. First of all it is not necessary to produce the double of the multiplicand in calculating the triple. Further, the delay from calculation of the triple is reduced by the multiplication of the triple in accordance with the present invention.

Above we have described and it should be understood that applicant's invention is not limited to the truth tables illustrating this embodiment. Other embodiments may be possible. For instance, use of other truth tables may be possible to create other multiples of the multiplicand without carry-propagate addition involving another multiple of the multiplicand. Accordingly, it is evident that the present invention is not limited to the particular embodiment disclosed herein.

What is claimed is:

1. A method for multiplying a multiplicand and a multiplier, the method comprising:
    accessing a multiplicand and a multiplier each of which is binary-coded decimal multi-digit number;
    generating a triple of the multiplicand by
        producing a greater than four (GT4) value for each multiplicand decimal digit based on whether the decimal digit is greater than four;
        using the GT4 value for each multiplicand decimal digit to produce each of,
        a digit generate value,
        a digit propagate value,
        a sum+0 value, and
        a sum+1 value;
    using each of the digit generate value and the digit propagate value to select either one of the sum+0 value and the sum+1 value for each multiplicand decimal digit, thereby resulting in a tripling the multiplicand; and
    generating, using an adder array, a multiple of the multiplier and the multiplicand using the multiplicand that has been tripled.

2. The method of claim 1, wherein the generating the triple of the multiplicand includes an odd multiple of the multiplicand is a triple of the multiplicand.

3. The method of claim 1, wherein the generating the triple of the multiplicand includes using the following truth table.

| LINE | INPUT DIGIT (DECIMAL) | INPUT DIGIT (RCD-84 21) | NEXT LESS SIGNIFICANT DIGIT >=5 | DIGIT GENERATE | DIGIT PROPAGATE | SUM + 0 (DECIMAL) | SUM + 0 (BCD-42 21) | SUM + 1 (DECIMAL) | SUM + 1 (BCD-42 21) |
|---|---|---|---|---|---|---|---|---|---|
| 1 | 0 | 0000 | 0 | 0 | 0 | 0 | 0000 | 1 | 0001 |
| 2 | 1 | 0001 | 0 | 0 | 0 | 3 | 0011 | 4 | 1000 |
| 3 | 2 | 0010 | 0 | 0 | 0 | 6 | 1010 | 7 | 1011 |
| 4 | 3 | 0011 | 0 | 0 | 1 | 9 | 1111 | 10 | 0000 |
| 5 | 4 | 0100 | 0 | 1 | 0 | 12 | 0010 | 13 | 0011 |
| 6 | 5 | 0101 | 0 | 0 | 0 | 5 | 1001 | 6 | 1010 |
| 7 | 6 | 0110 | 0 | 0 | 0 | 8 | 1110 | 9 | 1111 |
| 8 | 7 | 0111 | 0 | 1 | 0 | 11 | 0001 | 12 | 0010 |
| 9 | 8 | 1000 | 0 | 1 | 0 | 14 | 1000 | 15 | 1001 |
| 10 | 9 | 1001 | 0 | 1 | 0 | 17 | 1011 | 18 | 1110 |
| 11 | 0 | 0000 | 1 | 0 | 0 | 1 | 0001 | 2 | 0010 |
| 12 | 1 | 0001 | 1 | 0 | 0 | 4 | 1000 | 5 | 1001 |
| 13 | 2 | 0010 | 1 | 0 | 0 | 7 | 1011 | 8 | 1110 |
| 14 | 3 | 0011 | 1 | 1 | 0 | 10 | 0000 | 11 | 0001 |
| 15 | 4 | 0100 | 1 | 1 | 0 | 13 | 0011 | 14 | 1000 |
| 16 | 5 | 0101 | 1 | 0 | 0 | 6 | 1010 | 7 | 1011 |
| 17 | 6 | 0110 | 1 | 0 | 1 | 9 | 1111 | 10 | 0000 |
| 18 | 7 | 0111 | 1 | 1 | 0 | 12 | 0010 | 13 | 0011 |
| 19 | 8 | 1000 | 1 | 1 | 0 | 15 | 1001 | 16 | 1010 |
| 20 | 9 | 1001 | 1 | 1 | 0 | 18 | 1110 | 19 | 1111. |

There may be many variations to the diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been described, it will be understood that those skilled in the art, both now and in the future, may make various improvements and enhancements which mil within the scope of the claims which follow. These claims should be construed to maintain the proper protection for the invention first described.

4. The method of claim 1, wherein the adder array includes a binary coded decimal (BCD) adder.

5. The method of claim 1, wherein the generating the triple of the multiplicand includes using parallel prefix additions to calculate the triple of the multiplicand.

6. The method of claim 1, wherein the generating the triple of the multiplicand includes selecting sum+0 when there is no carry in to a binary digit column.

7. The method of claim 6, wherein the generating the triple of the multiplicand includes selecting the sum+1 when there is a carry in to the binary digits column.

8. The method of claim 7, wherein the generating the triple of the multiplicand includes storing the multiplicand and the triple of the multiplicand for each digit in registers to the adder as partial products in a multiplication process.

9. The method of claim 1, wherein the generating the triple of the multiplicand includes feeding the multiplier through a Booth decoder into the adder array.

10. The method of claim 1, wherein the generating the triple of the multiplicand includes using the Booth adder for selecting digits of the multiplicand and its triple in calculating the multiplication of the multiplicand and the multiplier.

11. A non-transitory computer program storage product for multiplying a multiplicand and a multiplier, the computer program storage product comprising instructions configured to perform a method, comprising:
    accessing a multiplicand and a multiplier each of which is binary-coded decimal multi-digit number;
    generating a triple of the multiplicand by
        producing a greater than four (GT4) value for each multiplicand decimal digit based on whether the decimal digit is greater than four;
        using the GT4 value for each multiplicand decimal digit to produce each of,
        a digit generate value,
        a digit propagate value,
        a sum+0 value, and
        a sum+1 value;
    using each of the digit generate value and the digit propagate value to select either one of the sum+0 value and the sum+1 value for each multiplicand decimal digit, thereby resulting in a tripling the multiplicand; and
    generating, using an adder array, a multiple of the multiplier and the multiplicand using the multiplicand that has been tripled.

12. The non-transitory computer program storage product of claim 11, wherein the generating the triple of the multiplicand includes an odd multiple of the multiplicand is a triple of the multiplicand.

13. The non-transitory computer program storage product of claim 11, wherein the generating the triple of the multiplicand includes using the following truth table.

14. The non-transitory computer program storage product of claim 11, wherein the adder array includes a binary coded decimal (BCD) adder.

15. The non-transitory computer program storage product of claim 11, wherein the generating the triple of the multiplicand includes using parallel prefix additions to calculate the triple of the multiplicand.

16. A multiplier for multiplying a multiplicand and a multiplier, the apparatus comprising:
    apparatus for
    accessing a multiplicand and a multiplier each of which is binary-coded decimal multi-digit number;
    generating a triple of the multiplicand by
        producing a greater than four (GT4) value for each multiplicand decimal digit based on whether the decimal digit is greater than four;
        using the GT4 value for each multiplicand decimal digit to produce each of,
        a digit generate value,
        a digit propagate value,
        a sum+0 value, and
        a sum+1 value;
    using each of the digit generate value and the digit propagate value to select either one of the sum+0 value and the sum+1 value for each multiplicand decimal digit, thereby resulting in a tripling the multiplicand; and
    generating, using an adder array, a multiple of the multiplier and the multiplicand using the multiplicand that has been tripled.

17. The multiplier of claim 16, wherein the generating the triple of the multiplicand includes an odd multiple of the multiplicand is a triple of the multiplicand.

18. The multiplier of claim 16, wherein the generating the triple of the multiplicand includes using the following truth table.

| LINE | INPUT DIGIT (DECIMAL) | INPUT DIGIT (RCD-84 21) | NEXT LESS SIGNIFICANT DIGIT >=5 | DIGIT GENERATE | DIGIT PROPAGATE | SUM + 0 (DECIMAL) | SUM + 0 (BCD-42 21) | SUM + 1 (DECIMAL) | SUM + 1 (BCD-42 21) |
|---|---|---|---|---|---|---|---|---|---|
| 1 | 0 | 0000 | 0 | 0 | 0 | 0 | 0000 | 1 | 0001 |
| 2 | 1 | 0001 | 0 | 0 | 0 | 3 | 0011 | 4 | 1000 |
| 3 | 2 | 0010 | 0 | 0 | 0 | 6 | 1010 | 7 | 1011 |
| 4 | 3 | 0011 | 0 | 0 | 1 | 9 | 1111 | 10 | 0000 |
| 5 | 4 | 0100 | 0 | 1 | 0 | 12 | 0010 | 13 | 0011 |
| 6 | 5 | 0101 | 0 | 0 | 0 | 5 | 1001 | 6 | 1010 |
| 7 | 6 | 0110 | 0 | 0 | 0 | 8 | 1110 | 9 | 1111 |
| 8 | 7 | 0111 | 0 | 1 | 0 | 11 | 0001 | 12 | 0010 |
| 9 | 8 | 1000 | 0 | 1 | 0 | 14 | 1000 | 15 | 1001 |
| 10 | 9 | 1001 | 0 | 1 | 0 | 17 | 1011 | 18 | 1110 |
| 11 | 0 | 0000 | 1 | 0 | 0 | 1 | 0001 | 2 | 0010 |
| 12 | 1 | 0001 | 1 | 0 | 0 | 4 | 1000 | 5 | 1001 |
| 13 | 2 | 0010 | 1 | 0 | 0 | 7 | 1011 | 8 | 1110 |
| 14 | 3 | 0011 | 1 | 1 | 0 | 10 | 0000 | 11 | 0001 |
| 15 | 4 | 0100 | 1 | 1 | 0 | 13 | 0011 | 14 | 1000 |
| 16 | 5 | 0101 | 1 | 0 | 0 | 6 | 1010 | 7 | 1011 |
| 17 | 6 | 0110 | 1 | 0 | 1 | 9 | 1111 | 10 | 0000 |
| 18 | 7 | 0111 | 1 | 1 | 0 | 12 | 0010 | 13 | 0011 |
| 19 | 8 | 1000 | 1 | 1 | 0 | 15 | 1001 | 16 | 1010 |
| 20 | 9 | 1001 | 1 | 1 | 0 | 18 | 1110 | 19 | 1111. |

| LINE | INPUT DIGIT (DECIMAL) | INPUT DIGIT (RCD-84 21) | NEXT LESS SIGNIFICANT DIGIT >=5 | DIGIT GENERATE | DIGIT PROPAGATE | SUM + 0 (DECIMAL) | SUM + 0 (BCD-42 21) | SUM + 1 (DECIMAL) | SUM + 1 (BCD-42 21) |
|---|---|---|---|---|---|---|---|---|---|
| 1 | 0 | 0000 | 0 | 0 | 0 | 0 | 0000 | 1 | 0001 |
| 2 | 1 | 0001 | 0 | 0 | 0 | 3 | 0011 | 4 | 1000 |
| 3 | 2 | 0010 | 0 | 0 | 0 | 6 | 1010 | 7 | 1011 |
| 4 | 3 | 0011 | 0 | 0 | 1 | 9 | 1111 | 10 | 0000 |
| 5 | 4 | 0100 | 0 | 1 | 0 | 12 | 0010 | 13 | 0011 |
| 6 | 5 | 0101 | 0 | 0 | 0 | 5 | 1001 | 6 | 1010 |
| 7 | 6 | 0110 | 0 | 0 | 0 | 8 | 1110 | 9 | 1111 |
| 8 | 7 | 0111 | 0 | 1 | 0 | 11 | 0001 | 12 | 0010 |
| 9 | 8 | 1000 | 0 | 1 | 0 | 14 | 1000 | 15 | 1001 |
| 10 | 9 | 1001 | 0 | 1 | 0 | 17 | 1011 | 18 | 1110 |
| 11 | 0 | 0000 | 1 | 0 | 0 | 1 | 0001 | 2 | 0010 |
| 12 | 1 | 0001 | 1 | 0 | 0 | 4 | 1000 | 5 | 1001 |
| 13 | 2 | 0010 | 1 | 0 | 0 | 7 | 1011 | 8 | 1110 |
| 14 | 3 | 0011 | 1 | 1 | 0 | 10 | 0000 | 11 | 0001 |
| 15 | 4 | 0100 | 1 | 1 | 0 | 13 | 0011 | 14 | 1000 |
| 16 | 5 | 0101 | 1 | 0 | 0 | 6 | 1010 | 7 | 1011 |
| 17 | 6 | 0110 | 1 | 0 | 1 | 9 | 1111 | 10 | 0000 |
| 18 | 7 | 0111 | 1 | 1 | 0 | 12 | 0010 | 13 | 0011 |
| 19 | 8 | 1000 | 1 | 1 | 0 | 15 | 1001 | 16 | 1010 |
| 20 | 9 | 1001 | 1 | 1 | 0 | 18 | 1110 | 19 | 1111. |

19. The multiplier of claim 16, wherein the adder array includes a binary coded decimal (BCD) adder.

20. The multiplier of claim 16 wherein the generating the triple of the multiplicand includes using parallel prefix additions to calculate the triple of the multiplicand.

\* \* \* \* \*